Patented Dec. 26, 1939

2,184,491

UNITED STATES PATENT OFFICE 2,184,491

PROCESS FOR THE PRODUCTION OF POLY-HYDROXY-FUCHSONE DERIVATIVES BY MEANS OF ALIPHATIC GROUPS

Zoltán Földi, Budapest, Hungary, assignor to the firm Chinoin Gyogyszer És Vegyészeti Termékek Gyára R. T. (Dr. Kereszty and Dr. Wolf), Ujpest, Hungary, a corporation of Hungary No Drawing. Application March 21, 1938, Serial No. 197,299. In Hungary March 26, 1937

15 Claims. (Cl. 260—395)

This invention relates to a process for the production of polyhydroxy-fuchsone derivatives etherified by means of aliphatic groups.

In the copending applications Serial Nos. 127,318 and 127,319 respectively I have described a process for the production of penta-hydroxy-fuchsones wherein the free or etherified phenolic hydroxyl group as well as the fuchsone oxygen atom are in all the three rings in the ortho position relatively to each other.

The present invention is based upon the observation that polyhydroxy-fuchsones etherified by means of aliphatic groups in which the number of free or etherified phenolic hydroxyl groups amounts in all to at least 3, and in which these free or etherified phenolic hydroxyl groups are not situated in the ortho position relatively to each other in any of the three benzene rings or at most in two of the three benzene rings show good dyeing properties, as well as good therapeutic effects, in addition to being readily accessible.

According to the present invention these polyhydroxy-fuchsone derivatives are produced by the oxidation of leuco-triphenyl methane derivatives which contain in the three benzene rings taken together four or more hydroxyl groups, of which at least one but not more than five are etherified by means of aliphatic groups, these free or etherified hydroxyl groups being situated in the ortho position relatively to each other in none or at the most in two of the three benzene rings, and at least one of the free hydroxyl groups being in the para position in one of the benzene rings. The benzene rings may also contain other substituents as e. g. alkyl, carboxyl, sulpho, halogen, nitro, amino and other groups. The oxidation can also be carried out simultaneously with the formation of the corresponding leuco-triphenyl-methane derivative.

The free or etherified hydroxyl groups of the leuco-triphenyl-methane derivative to be oxidised can advantageously be divided among the three benzene rings in such a manner, that in two benzene rings the free or etherified phenolic hydroxyl groups are in the ortho position relatively to each other, whereas in the third benzene ring the free or etherified hydroxyl groups are in other positions relatively to each other. It is, however, also possible to distribute the free or etherified phenolic hydroxyl groups among the three benzene rings in such a manner that the free or etherified phenol hydroxyl groups are in the ortho position relatively to each other in only one benzene ring, whereas in the two other benzene rings the free or etherified phenolic hydroxyl groups are in a different position. It is however also possible for the free or etherified hydroxyl groups to be distributed in some other manner. As regards the number of the etherified phenolic hydroxyl groups it has in general proved to be practical to have no more than one etherified phenolic hydroxyl group in each benzene ring or that, in general, about half of the phenolic hydroxyl groups present in the triphenyl-methane skeleton should be etherified with alkyl groups.

In case it is necessary to employ by way of starting materials leuco-triphenyl-methane derivatives in which in two benzene rings one free hydroxyl group is in ortho position relatively to the methane carbon atom, it is advisable, in order to avoid the closing of the xanthene ring, to etherify at least one of these hydroxyl groups so that the formation of the very difficultly soluble xanthene derivatives is prevented.

The organic nitrites, as, e. g., amyl nitrite and also the organic peroxides as, e. g., benzoyl peroxide have proved to be particularly suitable as oxidizing agents in the present process. The same oxidizing agents may be employed with favourable results in the oxidative condensation. As solvents or diluting means, solvents which are immiscible with water, as, e. g., ethyl acetate, are preferably employed. In the oxidation of the leuco compound, as well as in the oxidative condensation, dry hydrogen chloride preferably dissolved in ethyl acetate is preferably employed as the anhydrous mineral acid. It is, however, also possible to employ sulphuric acid or hydrochloric acid diluted with alcohol, or with glacial acetic acid, and use may also be made of de-hydrating salts as, e. g., zinc chloride.

The poly-hydroxy-fuchsones to which the present process relates, like the fuchsones described in the patent specifications referred to above, are capable of forming products of addition. They are capable of forming addition compounds particularly with anhydrous mineral acids, metal salts, organic or inorganic bases, bisulphites, sulphurous acid, etc. From these addition compounds the fuchsones can in general be regenerated easily. Moreover these addition compounds are in most cases particularly suitable for precipitating the fuchsones from the reaction mixture.

The products of the process are intermediate products for the manufacture of products capable of being utilised partly in the dyestuff industry and partly in medicine. In addition they generally possess valuable therapeutic properties. Among other things, they are bactericides.

*Examples*

1. 6 grams of 3,3'-dimethoxy-4,4'-dihydroxy-triphenyl methane are dissolved in 20 cc. of ethyl acetate and 2 cc. of amyl nitrite and finally 10 cc. of ethyl acetate containing hydrogen chloride are added to the solution. After allowing the solution to stand for 3 days the 3,3'-dimethoxy-4'-hydroxy-fushsone-hydrochloride, which separates in the form of crystals of metallic lustre is removed by means of a vacuum filter. Yield: 80 to 90% of the theoretical. The melting point of the free fuchsone is about 186° C.

2. 10 grams of 3,3'-dimethoxy-4,4'-4''-trihydroxy-triphenyl methane (obtainable from p-oxy-benzaldehyde and guaiacol, melting point 145° C., crystallised from chloroform) are dissolved in 100 cc. of ethyl acetate, mixed with the calculated quantity of amyl nitrite, following which 40 cc. of ethyl acetate saturated with dry hydrogen chloride are added to the mixture. After allowing the mixture to stand for a considerable length of time dark crystals of metallic lustre of m-dimethoxy-p-dihydroxy-fuchsone-hydrochloride are precipitated, which decompose at a temperature of about 203° C. The free fuchsone decomposes at a temperature of about 248° C.

3. 15 grams of m-nitro-benzaldehyde and 24.8 grams of guaiacol are dissolved in 45 cc. of absolute alcohol and 25 cc. of concentrated sulphuric acid are added to the solution whilst cooling it in ice. Following this the solution is stirred at room temperature. After 12 hours the solution is poured out on ice, the mass separated is taken up into chloroform, the chloroform solution is dried over sulphate of sodium and rendered free of solvent. The residue is dissolved in 50 cc. of ethyl acetate and 10 cc. of amyl nitrite, and 50 cc. of ethyl acetate containing about 22% of dry hydrogen chloride are added to it. After allowing the mixture to stand for 12 hours, the hydrochloride of the m-nitro-m-dimethoxy-p-hydroxy-fuchsone which separates in the form of dark crystals of metallic lustre is filtered off. Point of decomposition of the hydrochloride is about 152° C.

4. 5 grams of 3-nitro-4-hydroxy-benzaldehyde and 7.5 grams of guaiacol are shaken with 100 cc. of ethyl acetate saturated with hydrochloric acid and allowed to stand over night. Following this the greatest part of the ethyl acetate is distilled off, and to the filtered and concentrated solution 4 cc. of amyl nitrite and 10 cc. of ethyl acetate saturated with hydrochloric acid are added. After allowing the mixture to stand for a considerable length of time the m-nitro-m-di-methoxy-p-dihydroxy-fuchsone-hydrochloride is drawn off by suction and dried. Yield 7 grams. Point of decomposition about 192° C.

The fushsone can be obtained not only as a hydrochloride but also as free fushsone. For this purpose 3 grams of hydrochloride are suspended in 10 cc. of alcohol and, after the addition of 10 cc. of an approximately 10% solution of sodium bicarbonate, are thoroughly shaken. Following this, dilution is effected by means of ethyl acetate, 2 cc. of glacial acetic acid are added and the fuchsone is repeatedly extracted with ethyl acetate. The united ethyl acetate solutions are washed first with a solution of calcium chloride, and following this with water, and finally the ethyl acetate is distilled off. The residue crystallises from a small quantity of ethyl acetate. The free fuchsone melts at a temperature of about 179° C., decomposing at the same time.

5. To 8.5 grams of 2,2'-di-isopropyl-3''-methoxy-4,4',4''-trihydroxy-5,5'-dimethyl-triphenyl methane (obtainable from thymol and vanillin, melting point 182° C.) there are added 30 cc. of ethyl acetate, 3 cc. of amyl nitrite and 15 cc. of ethyl acetate containing 10% of dry hydrogen chloride. A few hours later the o-di-isoproyl-m-dimethyl-m-methoxy-p-dihydroxy-fuchsone-hydrochloride crystallises in needles of metallic lustre. Yield: almost theoretrical. The free fuchsone obtained from the hydrochloride melts at about 230° C.

6. 10 grams of 3-methoxy-4,4',4''-trihydroxy-triphenyl methane (obtainable from vanillin and phenol, melting point of the compound crystallised from benzene about 132° C.) are dissolved in 60 cc. of ethyl acetate, 4 cc. of amyl nitrite are added to the solution and 2 cc. of ethyl acetate containing 10% of dry hydrogen chloride are added to the solution in drops. After allowing the solution to stand for 12 hours the m-methoxy-p-dihydroxy-fuchsone-hydrochloride has crystallised out. Melting point about 206° C. Yield almost quantitative. Melting point of the free fuchsone about 275° C.

7. 1 gram of 2,2',3''-trimethoxy-4,4',4''-trihydroxy-triphenyl-methane (obtainable from the monomethyl ether of resorcin and vanillin; it does not melt up to 280° C.) is dissolved in 6 cc. of ethyl acetate and 0.4 cc. of amyl nitrite and 2 cc. of ethyl acetate containing 10% of dry hydrogen chrolide are added to the solution. After allowing the solution to stand for a few hours, the o-dimethoxy-p-dihydroxy-fuchsone-hydrochloride crystallises out in dark metallic crystals. This substance does not melt up to 280° C. Acid solutions of the compound are red, while alkaline solutions are of violet colour.

8. 3 grams of 3,3'-dimethoxy-3''-amino-4,4',4''-trihydroxy-triphenyl methane (melting point 178–179° C., obtainable for example by means of the catalytic reduction of the nitro-dimethoxy-dihydroxy-fuchsone described in Example 4 or of the 3,3'-dimethoxy-3''-nitro-4,4',4''-trihydroxy-triphenyl methane) and 2.7 grams of benzoyl peroxide are saturated with dry hydrogen chloride in 50 cc. of ethyl acetate, being cooled simultaneously in ice. After allowing the solution to stand for one day, the solvent is distilled off in vacuô, the dark red residue is dissolved in dilute hydrochloric acid, shaken out with ether, following which the watery layer is poured into an excess quantity of solution of sodium acetate. The free amino-fuchsone base separated is dissolved in ethyl acetate, the ethyl acetate is distilled off and the residue is dissolved in about 60 cc. of 5% hydrochloric acid. The liquid is filtered off from any portion which may possibly have remained undissolved, and the m-amino-m-dimethoxy-p-dihydroxy-fuchsone is precipitated by the addition of sodium acetate. The product is a dark brown powder which is soluble in acids with a red colour and in alkalies with a violet colour.

9. 3 grams of 3,3'-dimethoxy-3''-amino-4,4'-dihydroxy-triphenyl methane (obtainable among others, from the m-nitro-m-dimethoxy-p-hydroxy-fuchsone-hydrochloride by catalytic reduction, melting point 162–164° C.) are, as described in the preceding example, oxidised by means of benzoyl peroxide. There is obtained the m-amino-m-dimethoxy-p-hydroxy-fuchsone, which as regards its properties greatly resembles the product described in the preceding example.

10. 5 grams of the calcium salt of vanillin-5-sulphonic acid and 3.8 grams of phenol are stirred with 10 cc. of ethyl acetate containing 34% of dry hydrogen chloride following which 3 cc. of amyl nitrite are added dropwise, whilst cooling in ice. The solution assumes a dark red hue. After stirring for several hours 10 cc. of absolute alcohol are added and the mixture is allowed to stand overnight, following which it is filtered off. The calcium salt of the m-methoxy-p-dihydroxy-fuchsone-sulphonic acid is a dark red powder which can be crystallised from hot water. With acids it gives a red, with alkalies a violet solution.

11. According to the method of operation described in the preceding examples there is obtained, from 3,3'-dimethoxy-4,4',4''-trihydroxy-triphenyl methane-3-carboxylic acid (obtainable from p-hydroxy-benzaldehyde-3-carboxylic acid and guaiacol) by oxidation with amyl nitrite, the m-dimethoxy-p-dihydroxy-fuchsone-m-carboxylic acid, the hydrochloride of which crystallises in dark metallic crystals. Melting point of the hydrochloride is 206–207° C. (decomposition); that of the free fuchsones 233° C. (decomposition). Its alkaline solutions are of a dark violet colour.

What I claim is:

1. A polyhydroxyfuchsone compound containing, on the quinoid benzene ring, a quinonic oxygen in para position to the methane carbon atom; the benzene rings of the said compound being further substituted by substituents selected from the group consisting of H, alkyl, hydroxy, alkoxy, carboxy, sulpho, halogen and nitro; the total number of hydroxy and alkoxy substituents contained in the benzene rings being more than two but less than six, the number of alkoxy substituents present being at least one, and in at least one of the benzene ring two members of the group consisting of hydroxy and alkoxy being in a relative position other than ortho.

2. A polyhydroxyfuchsone compound containing, on the quinoid benzene ring, a quinonic oxygen in para position to the methane carbon atom; the benzene rings of the said compound being further substituted by substituents selected from the group consisting of H, alkyl, hydroxy, alkoxy, carboxy, sulpho, halogen and nitro; the total number of hydroxy and alkoxy substituents contained in the benzene rings being more than two but less than six, the number of alkoxy substituent present being at least one, and in one of the benzene rings the quinonic oxygen and a number of the group consisting of hydroxy and alkoxy being in a relative position other than ortho.

3. A polyhydroxyfuchsone compound containing, on the quinoid benzene ring, a quinonic oxygen in para position to the methane carbon atom; the benzene rings of the said compound being further substituted by substituents selected from the group consisting of H, alkyl, hydroxy, alkoxy, carboxy, sulpho, halogen and nitro; the total number of hydroxy and alkoxy substituents contained in the benzene rings being at least three, while the number of alkoxy substituents present is at least one; two members of the group consisting of hydroxy and alkoxy being in mutual ortho position on not more than one benzene ring.

4. A polyhydroxyfuchsone compound containing on the quinoid benzene ring, a quinonic oxygen in para position to the methane carbon atom; the benzene rings of the said compound being further substituted by substituents selected from the group consisting of H, alkyl, hydroxy, alkoxy, carboxy, sulpho, halogen and nitro; the total number of hydroxy and alkoxy substituents contained in the benzene rings being at least four, while the number of alkoxy substituents present is at least one; not more than four members of the group consisting of hydroxy and alkoxy being present as mutually ortho positioned pairs on two benzene rings.

5. A polyhydroxyfuchsone compound containing, on the quinoid benzene ring, a quinonic oxygen in para position to the methane carbon atom; the benzene rings of the said compound being further substituted by substituents selected from the group consisting of H, alkyl, hydroxy, alkoxy, carboxy, sulpho, halogen and nitro; the total number of hydroxy and alkoxy substituents contained in the benzene rings being more than two but less than five, while the number of alkoxy substituents present is at least one; the hydroxy and alkoxy groups being distributed among the benzene rings in such manner that no benzene ring contains more than two members of the class consisting of these groups, with the restriction that the quinoid benzene ring contains less than two members of the said class.

6. A polyhydroxyfuchsone compound containing, on the quinoid benzene ring, a quinonic oxygen in para position to the methane carbon atom; the benzene rings of the said compound being further substituted by substituents selected from the group consisting of H, alkyl, hydroxy, alkoxy, carboxy, sulpho, halogen and nitro; the total number of hydroxy and alkoxy substituents contained in the benzene rings being at least three but less than five, the number of alkoxy substituents present being at least one, with the restriction that no benzene ring contains more than one alkoxy substituent.

7. A polyhydroxyfuchsone derivative of the following general formula

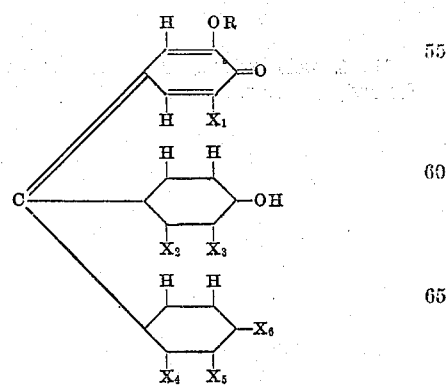

wherein $X_1$ represents a member of the group consisting of H and $SO_3H$; $X_2$ and $X_4$ represent a member of the group consisting of H, alkyl and alkoxy; $X_3$ represents a member of the group consisting of H and alkoxy; $X_5$ represents a member of the group consisting of H, $NO_2$ and COOH; $X_6$ represents a member of the group consisting of H, OH and alkoxy; and R represents alkyl.

8. A polyhydroxyfuchsone derivative of the following general formula

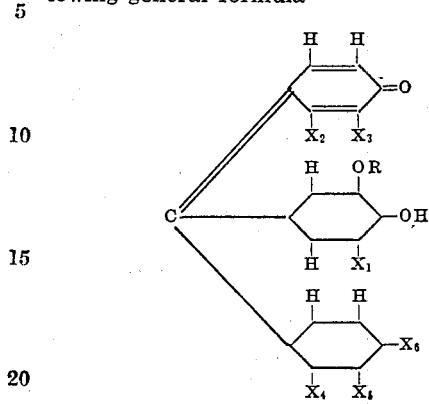

wherein $X_1$ represents a member of the group consisting of H and $SO_3H$; $X_2$ and $X_4$ represent a member of the group consisting of H, alkyl and alkoxy; $X_3$ represents a member of the group consisting of H and alkoxy; $X_5$ represents a member of the group consisting of H, $NO_2$ and COOH; $X_6$ represents a member of the group consisting of H, OH and alkoxy; and R represents alkyl.

9. A polyhydroxyfuchsone derivative of the following general formula

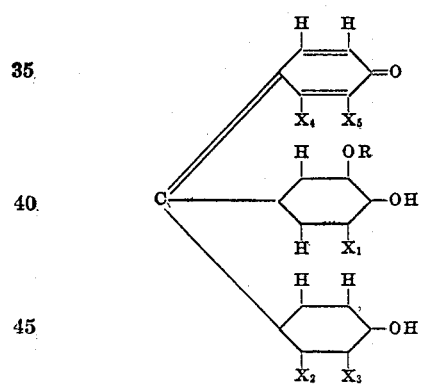

wherein $X_1$ represents a member of the group consisting of H and $SO_3H$; $X_2$ and $X_4$ represent a member of the group consisting of H, alkyl and alkoxy; $X_3$ represents a member of the group consisting of H and alkoxy; $X_5$ represents a member of the group consisting of H, $NO_2$ and COOH; and R represents alkyl.

10. A polyhydroxyfuchsone derivative of the following general formula

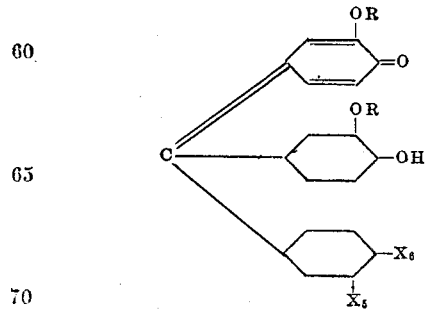

wherein $X_5$ represents a member of the group consisting of H, $NO_2$ and COOH; $X_6$ represents a member of the group consisting of H, OH and alkoxy; and R represents alkyl.

11. A polyhydroxyfuchsone derivative of the following general formula

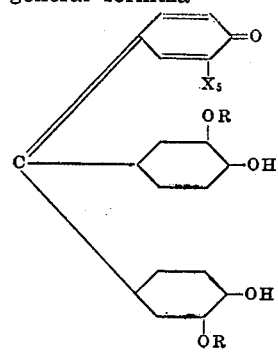

wherein $X_5$ represents a member of the group consisting of H, $NO_2$ and COOH; and R represents an alkyl group.

12. A process for preparing polyhydroxyfuchsone derivatives, which comprises oxidizing leuko triphenylmethane derivatives, the benzene rings of which are substituted by substituents selected from the group consisting of H, alkyl, hydroxy, alkoxy, carboxy, sulpho, halogen and nitro; the total number of hydroxy and alkoxy substituents being at least four but not more than six, while the number of alkoxy substituents present is at least one and the number of hydroxy substituents present is also at least one; one of the hydroxy substituents being in para position to the methane carbon atom; the hydroxy and alkoxy groups being distributed among the benzene rings in such manner that no benzene ring contains more than two members of the class consisting of these groups; two members of the group consisting of hydroxy and alkoxy being in mutual ortho position on one benzene ring.

13. A process for preparing polyhydroxyfuchsone derivatives, which comprises oxidizing leuko triphenylmethane derivatives, the benzene rings of which are substituted by substituents selected from the group consisting of H, alkyl, hydroxy, alkoxy, carboxy, sulpho, halogen and nitro; the total number of hydroxy and alkoxy substituents being at least four but not more than six, while the number of alkoxy substituents present is at least one and the number of hydroxy substituents present is also at least one; one of the hydroxy substituents being in para position to the methane carbon atom; the hydroxy and alkoxy groups being distributed among the benzene rings in such manner that no benzene ring contains more than two members of the class consisting of these groups; four members of the group consisting of hydroxy and alkoxy being present as mutually ortho positioned pairs on two benzene rings.

14. A process for preparing polyhydroxyfuchsone derivatives, which comprises oxidizing leuko triphenylmethane derivatives, the benzene rings of which are substituted by substituents selected from the group consisting of H, alkyl, hydroxy, alkoxy, carboxy, sulpho, halogen and nitro; the total number of hydroxy and alkoxy substituents being at least four but not more than six, while the number of alkoxy substituents present is at least one and the number of hydroxy substituents present is also at least one; one of the hydroxy substituents being in para position to the methane carbon atom; the hydroxy and alkoxy groups being distributed among the benzene rings in such manner that no benzene ring contains more than two members of the class consisting of these groups; four members of the group consisting of hydroxy and alkoxy being present as mutually ortho positioned pairs on two benzene rings; none of the benzene rings of the leuko triphenylmethane derivative containing more than one alkoxy group.

15. A process for preparing polyhydroxyfuchsone derivatives which comprises oxidizing triphenylmethanes of the following general formula

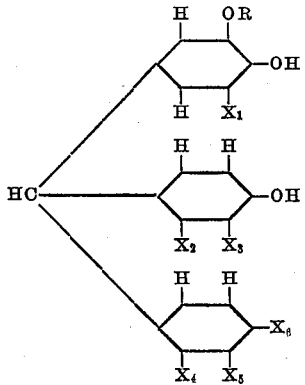

wherein $X_1$ represents a member of the group consisting of H and $SO_3H$; $X_2$ and $X_4$ represent a member of the group consisting of H, alkyl and alkoxy; $X_3$ represents a member of the group consisting of H and alkoxy; $X_5$ represents a member of the group consisting of H, $NO_2$ and COOH; $X_6$ represents a member of the group consisting of H, OH and alkoxy; and R represents alkyl.

ZOLTÁN FÖLDI.